Sept. 16, 1969     R. J. WILKINSON ET AL     3,467,500
AUTOMATIC SAMPLE DIGESTING DEVICE Filed Aug. 18, 1966     3 Sheets-Sheet 1

INVENTORS:
ROBERT J. WILKINSON
JOHN W. GREEN
BY
John Langley
ATTORNEY

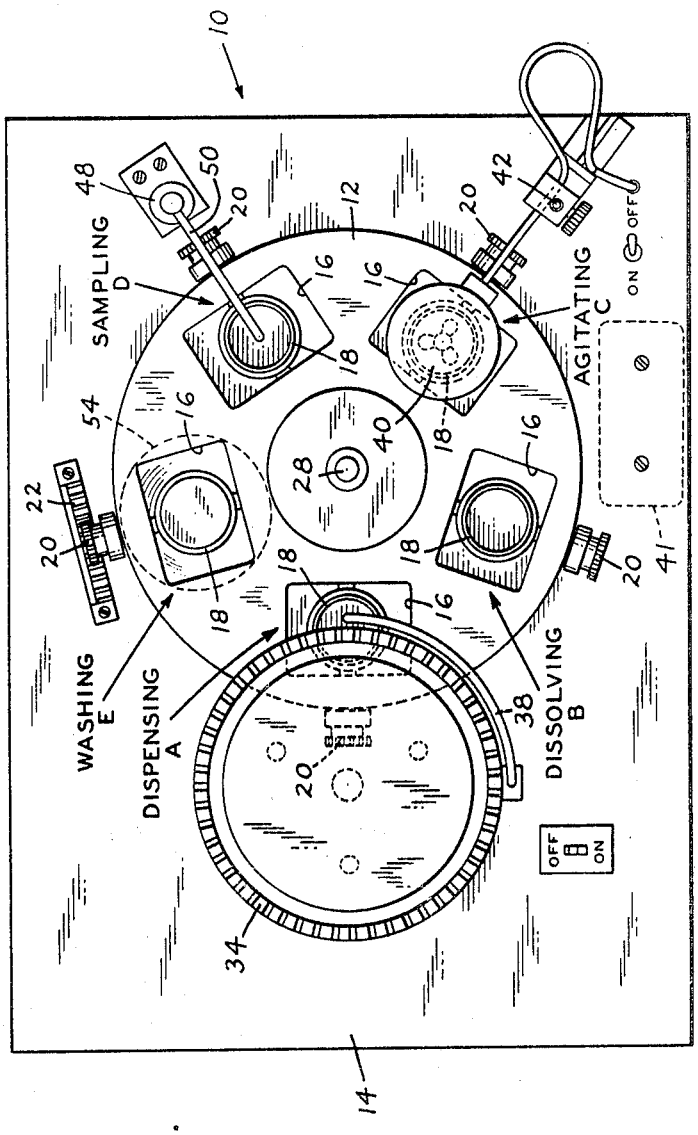

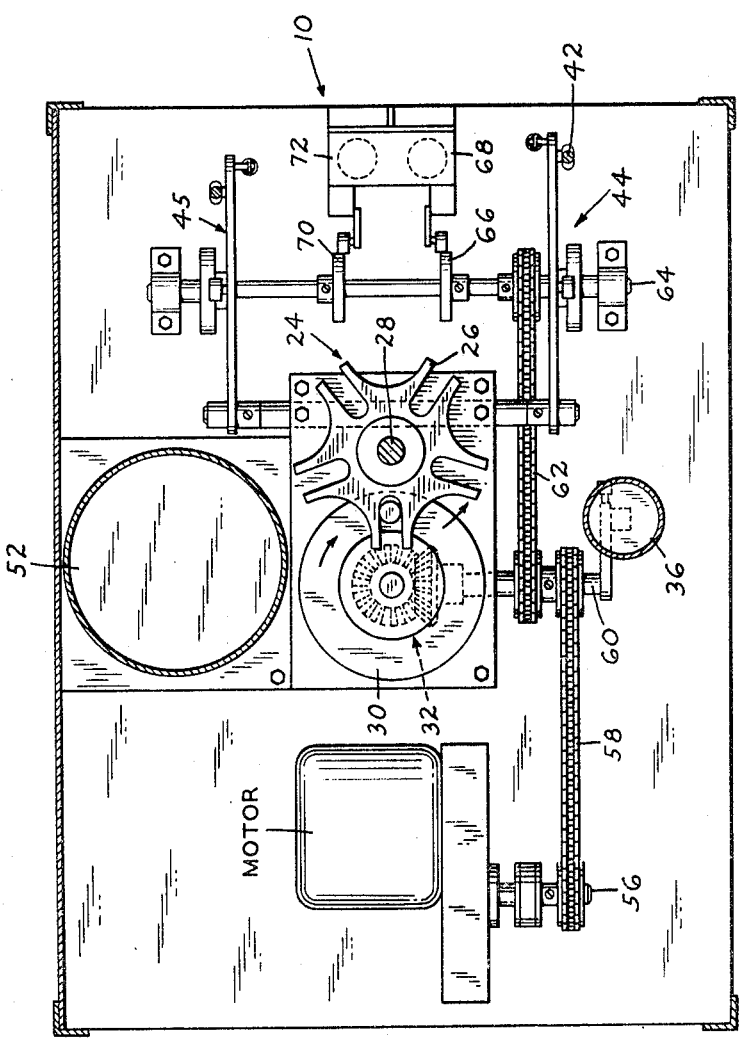

United States Patent Office 3,467,500
Patented Sept. 16, 1969

3,467,500
AUTOMATIC SAMPLE DIGESTING DEVICE
Robert J. Wilkinson, Burlington, and John W. Green, Gloucester, N.J., assignors to American Home Products Corporation, New York, N.Y., a corporation of Delaware
Filed Aug. 18, 1966, Ser. No. 573,413
Int. Cl. G01n 1/28; G01j 3/00; B01d 11/00
U.S. Cl. 23—230                                    9 Claims

ABSTRACT OF THE DISCLOSURE

Apparatus for automatically analyzing small amounts of chemical compounds by use of a five station intermediately rotated turntable. The sample is added to a container located in the turntable, dissolved in a solvent, agitated, and a portion of the sample is withdrawn to an analyzer. The container is then emptied and cleaned to make it ready for the next sample. A method of carrying out such sample preparation is described which is applicable to the foregoing apparatus and to other apparatus.

---

This invention relates to an apparatus and method for the analysis of medicinal preparations.

More particularly, it relates to an apparatus and method for rapidly and automatically preparing medicaments such as tablets, capsules and suspensions for use in an automatic sensing device whereby there is automatically recorded an assay or analysis of the medicament.

In the production of pharmaceutical preparations it is desirable to monitor production by regularly sampling the production preparations and analyzing them so as to assure uniformity. In order to perform a large number of such routine analyses, recourse is had more and more to mechanized or automated analysis.

Equipment and apparatus are already available whereby some property of a liquid sample, such as pH, concentration of a particular metal ion or ratio of ion concentration can be sensed and recorded.

With the existing automatic analyzers, it has been necessary to prepare the samples manually. This task entails the necessity of digesting tablets or suspensions in a measured amount of solvent, sampling the solution, and placing the sample in the automatic digester.

Prior art apparatuses and methods for preparing the samples for the sensing device, which utilize a single container, still require a degree of manual control and are not adaptable for high speed production control.

It is the general object of the present invention to avoid and overcome the foregoing and other difficulties and objections to prior art practices by the provision of a more fully automatic and more efficient apparatus.

More specifically, the object of the present invention is to provide an apparatus for automatically digesting tablets and suspensions in preparation for a sensing device.

Further, another object of the present invention is to automatically and rapidly digest tablets for analysis by a spectrophotometer.

A yet further object of the invention is to provide an apparatus that is capable of continuously and rapidly digesting pharmaceutical preparations and transmitting them to an automatic sensing device.

The aforesaid objects of the present invention, and other objects which will become apparent as the description proceeds, are achieved by providing a method comprising the continuous and simultaneous steps of (1) automatically dispensing a preparation and adding a measured amount of solvent into a first container; (2) permitting a preparation to dissolve in a second container; (3) agitating to completely dissolve a preparation in the reagent in a third container; (4) removing a portion of the solution from a fourth container for transmission to the analyzer; (5) evacuating, washing and drying a fifth container; and (6) sequentially repeating the steps of (1) through (5) with each of said containers.

A sample digesting device embracing certain features of the present invention may comprise, in combination with an automatic dispensing means and an automatic sensing apparatus, (A) a support base; (B) a turntable mounted above said base capable of intermittent rotation, said turntable having a plurality of openings and a plurality of tiltably mounted containers over said openings; (C) means for intermittently rotating said turntable; (D) means mounted on said base for automatically adding a measured amount of reagent to said containers so as to form a solution; (E) means mounted on said base for automatically agitating the contents of said containers; (F) means mounted on said base for automatically extracting a predetermined amount of solution from said containers and transferring said solution to said sensing apparatus; (G) a means for inverting said containers; (H) a means for washing said inverted containers prior to receiving a new amount of sample for analysis; and (I) a means for synchronizing and activating the means of (C) through (H) during immobilization.

For a better understanding of the present invention, reference should be had to the accompanying drawings wherein like numerals of reference indicate similar parts throughout the several views and wherein:

FIG. 2 is a plan view of the tablet digester of the present invention.

FIG. 3 is a plan view of the invention in section taken along line 3—3 of FIG. 1.

Figure 1:
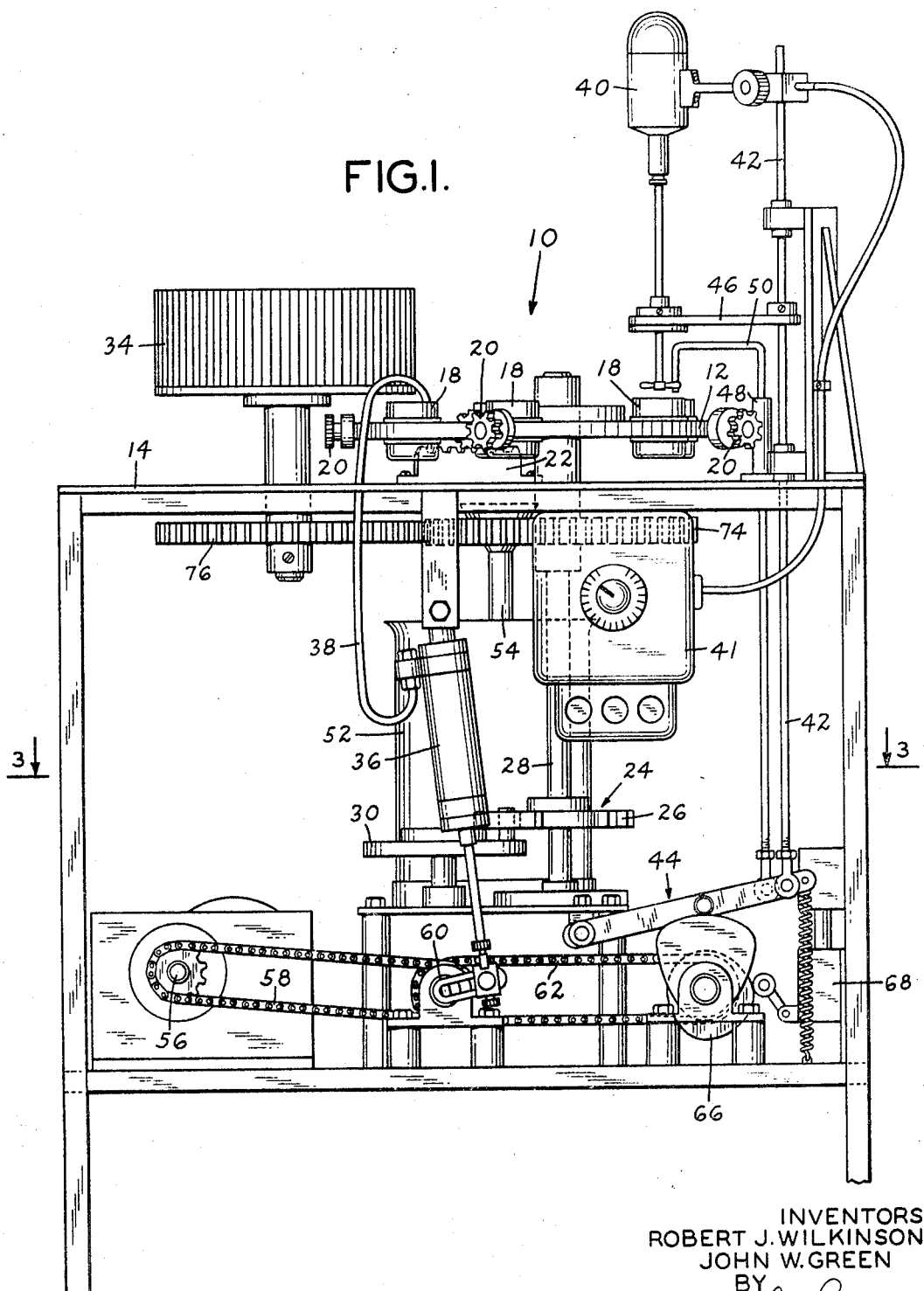
FIG. 1 is a front elevation of one embodiment of the invention.

Although the principles of the present invention are broadly applicable to the automatic digesting of pharmaceutical preparations, the present invention is particularly adapted for use in digesting tablets for analysis by a sensing device, and hence it has been so illustrated and will be so described.

With specific reference to the form of the present invention illustrated in the drawings, and referring particularly to FIGS. 1 through 3, the improved automatic tablet digester apparatus is indicated generally by the reference numeral 10.

In the operation of the invention, a turnable 12 of digester 10 having openings 16, preferably equidistant along the perimeter, is rotatably mounted on a support 14 by a rotatable shaft 28. A plurality of containers 18 are pivotally mounted over openings 16 of turntable 12 (as shown in FIG. 2) so that they may be inverted to empty out the contents and be spray cleaned. While various means may be utilized to invert the containers 18, one suitable way is to provide a gear means 20 on the containers 18 which engages with a ratchet means 22 on the support 14 to rotate the gear means 20 and thereby invert the containers 18 at the desired location.

A drive means 24 (as shown in FIG. 3) is provided for intermittently rotating turntable 12 so as to cause the containers 18 on turntable 12 to stop at least five times at predetermined work stations (A, B, C, D, E). One such drive means is a Geneva gear 26 affixed to rotatable shaft 28 and driven by Geneva drive wheel 30 that is activated by a gear cluster 32.

Referring to FIGS. 1 and 2 there is shown at work station A a means for dispensing the sample to be analyzed, such as a tablet dispenser 34, and a means for adding automatically a measured quantity of reagent, such as pump 36 having a delivery tube 38.

The container from station A advances to station B where the tablet is permitted to dissolve in the reagent. If desired, a means for heating the container 18 may be placed at station B for use when the sample is difficult to dissolve.

So as to agitate the solution in the containers 18 and completely dissolve the sample after station B, there is provided at station C an electric mixer 40 which advances for a predetermined time into the container. The mixer 40 may be raised and lowered by being mounted on a support rod 42 that cooperates with an elevating cam means 44. Mixer 40 preferably contains a shield 46 (shown in FIG. 1) which seals the container to prevent loss from splashing during agitation and a rheostat 41 for controlling the agitation speed.

After withdrawal of the mixer 40, the container from station C advances to station D where a sampler 48, containing a means for automatically withdrawing a measured amount of sample, advances a tube 50 into the container, extracts a predetermined amount of sample and passes the measured amount of sample to an automatic analyzer (not shown), such as a spectrophotometer. The sampler 48 may be provided with a filter means (not shown) for removing any undissolved particles from the sample prior to passage to the analyzer.

The container from station D rotates with the turntable 12 to station E where the sprocket means 20 engages the chain means 22 mounted on the support 14 thereby causing the sprocket means 20 to rotate and invert the container over opening 16 so that the sample is dumped into sump 52 through a funnel 54 below the opening 16. At station E in opening 16 is also mounted a solvent spraying means (not shown) that is activated after inversion of the container.

Moving from station E to station A the washed container is reinverted into the up-right position so as to receive a fresh sample.

Referring now more particularly to FIG. 3, there is shown the synchronous activating means for the tablet digester of this invention. The drive shaft 56 of a conventional motor by means of an endless belt rotates shaft 60. Shaft 60 is linked at one end for activating pump 36 and communicates at the other end with gear cluster 32 operating Geneva wheel drive 30 so that the pump 36 will function when the containers 18 are in proper position when the reagent is dispensed.

Operating off shaft 60 is a chain 62 which drives a control means for synchronizing the activity at work stations A, C, D and E such as rotatable shaft 64.

Shaft 64 communicates at one end with the elevating cam means 44 for raising and lowering mixer support rod 42 and at the other end with elevating cam means 45 for raising and lowering sampler tube 50 into the containers 18. A switch (not shown) on sampler 49 is triggered when tube 50 is lowered so as to activate the sampler 48 and extract a measured sample.

Shaft 64 is further provided with a cam means 66 for actuating microswitch 68 which energizes mixer 40, and a cam means 70 for actuating microswitch 72 which activates the solvent spraying means.

In the operation of the device, a motor rotates drive shaft 56 which causes chain 58 to activate rotatable shaft 60. Rotation of shaft 60 causes the activation of gear cluster 32, pump 36 and chain 62. Gear cluster 32 impels Geneva wheel drive 30 which rotates the Geneva wheel 26. Shaft 28 on which Geneva wheel 26 is affixed rotates turntable 12 and a gear 74 that meshes with gear 76 of tablet dispenser 34 for synchronous rotation to tablet dispenser 34 with the turntable 12. Use of a Geneva wheel 26 is one method of providing synchronous immobilization of the containers 18 at the work stations (A, B, C, D, E).

Rotation of chain 62 causes rotation of rotatable shaft 64 which in turn impels the elevating cam means 44 of mixer 40, the elevating cam means 45 of sampler 48, the activating cam means 66 of microswitch 68 for mixer 40 and the activating cam means 70 of microswitch 72 for sampler tube 50.

It is understood that during immobilization of the containers 18 at the work stations (A, B, C, D, E) reagent and sample is being dispensed at station A, the sample is being dissolved at station B, mixer 40 is advanced into the container 18 at station C and activated so as to agitate the mixture, sampler tube 50 is moved into container 18 at station D and sampler 48 is activated to withdraw a measured portion of sample, and at work station E a solvent sprayer is cleaning an inverted container 18, all simultaneously.

It will be recognized by those skilled in the art that the objects of the present invention have been achieved by the provision of an improved continuous and automatic sample digesting device for use with any conventional analyzer and the automatic method for continuously and uninterruptedly preparing samples for analysis by synchronous and simultaneous operation at various work stations.

Obviously the embodiment shown in exemplary only and a wide variety of embodiments may be devised without departing from the spirit and scope of the invention.

What is claimed is:

1. In combination with a sample dispensing means and a sensing apparatus, a device for preparing said sample for transmission to the sensing apparatus, said device comprising:
  (A) a support base;
  (B) a turntable mounted above said base capable of intermittent rotation, said turntable having a plurality of openings and a plurality of tiltably mounted containers disposed over said openings;
  (C) means mounted on said base for automatically adding a measured amount of reagent to said containers having dispensed therein a measured amount of solvent for solubilizing said sample;
  (D) means mounted on said base for automatically agitating the contents of said containers;
  (E) means mounted on said base for automatically extracting a predetermined amount of solution from said containers and transferring said solution to said sensing apparatus;
  (F) means mounted on said base for inverting said containers;
  (G) means for washing said inverted containers prior to receiving a new amount of sample;
  (H) a control means for synchronizing together the means of C, D and E; and
  (I) means for intermittently rotating said turntable and activating said control means.

2. The device of claim 1 wherein said containers are mounted equidistantly along the perimeter of said turntable.

3. The device of claim 1 including elevating cam means cooperating with said control means for inserting said means for agitation into the container.

4. The device of claim 1 including elevating cam means cooperating with said control means for inserting the means for extracting into the container.

5. The device of claim 1 wherein said control means is a rotatable shaft communicating with each of the means of (C), (D), (E), (G) and (I).

6. In combination with a tablet dispensing means and a spectrophotometer, a tablet digesting device comprising:
  (A) a support base;
  (B) a turntable mounted above said base capable of intermittent rotation, said turntable having a plurality of openings along the perimeter and a plurality of tiltably mounted containers disposed over said openings having a means for rotation;
  (C) a pump mounted on said base for automatically adding a measured amount of solvent to a first container having dispensed therein a fixed amount of tablets;

(D) a mixer mounted on said base adapted to be inserted into a container;

(E) extraction means mounted on said base for automatically extracting a measured amount of solution from said containers and transferring said solution to said spectrophotometer for analysis;

(F) means mounted on said base for engaging the rotation means of the container so as to invert the container over the opening and then reinvert to receive a further sample of tablets from said tablet dispensing means;

(G) a spraying means mounted on said base for washing the inverted containers;

(H) a first elevating cam means for raising and lowering said mixer into the containers;

(I) a second elevating cam means for raising and lowering said extracting means into the containers;

(J) a rotatable shaft communication with said first and second cam means for activating and synchronizing said first and second cam means with the rotation of said turntable; and (K) a means for intermittently rotating said turntable and activating said rotatable shaft.

7. The device of claim 6 in which five containers are tiltably mounted equidistantly along the perimeter of said turntable.

8. The device of claim 6 including a means for synchronizing the dispensing of tablets from said tablet dispenser with the rotation of said turntable.

9. A method for continuously digesting a plurality of pharmaceutical compositions in containers mounted on a turntable capable of intermittent rotation in preparation for analysis by a spectrophotometer which comprises the simultaneous steps of:

(A) automatically dispensing a pharmaceutical composition and a measured amount of solvent into a first container;

(B) dissolving a pharmaceutical composition in a second container;

(C) automatically agitating a pharmaceutical composition and a solvent in a third container;

(D) automatically removing a portion of a solution of a pharmaceutical composition from a fourth container for transmission to said spectrophotometer;

(E) evacuating and washing a fifth container; and then (F) sequentially repeating the steps of (A) through (E) with each of said containers during immobilization of said turntable.

References Cited

UNITED STATES PATENTS 3,223,485   12/1965   Ferrari et al. _____ 23—253

MORRIS O. WOLK, Primary Examiner

R. E. SERWIN, Assistant Examiner

U.S. Cl. X.R.

23—253; 134—22; 222—166; 259—8, 23, 43